US011966199B2

(12) United States Patent
Grivet

(10) Patent No.: US 11,966,199 B2
(45) Date of Patent: Apr. 23, 2024

(54) TIMEPIECE COMPONENT FOR A TIMEPIECE CASE OR FOR A TIMEPIECE

(71) Applicant: ROLEX SA, Geneva (CH)

(72) Inventor: Teddy Grivet, Geneva (CH)

(73) Assignee: ROLEX SA, Geneva (CH)

( * ) Notice: Subject to any disclaimer, the term of this patent is extended or adjusted under 35 U.S.C. 154(b) by 172 days.

(21) Appl. No.: 17/126,479

(22) Filed: Dec. 18, 2020

(65) Prior Publication Data

US 2021/0191333 A1 Jun. 24, 2021

(30) Foreign Application Priority Data

Dec. 20, 2019 (EP) .................................... 19218605

(51) Int. Cl.

| | |
|---|---|
| ***G04B 19/28*** | (2006.01) |
| ***G04B 37/08*** | (2006.01) |
| ***G04B 45/00*** | (2006.01) |

(52) U.S. Cl.

CPC ........... *G04B 19/283* (2013.01); *G04B 37/08* (2013.01); *G04B 45/0076* (2013.01)

(58) Field of Classification Search

CPC .... G04B 19/283; G04B 37/084; G04B 37/22; G04B 45/0076; G04B 37/08; G04B 19/28; G04B 39/02; G04B 37/00; G04B 37/0008

See application file for complete search history.

(56) References Cited

U.S. PATENT DOCUMENTS

| | | | | |
|---|---|---|---|---|
| 3,688,492 A * | 9/1972 | Yabana | G04B 39/00 | 368/294 |
| 3,817,025 A * | 6/1974 | Siegrist | G04B 39/02 | 368/291 |
| 3,858,388 A | 1/1975 | Fujimori et al. | | |
| 3,934,402 A * | 1/1976 | Fujimori | G04B 39/02 | 368/291 |
| 3,950,937 A * | 4/1976 | Fujimori | G04B 37/084 | 368/291 |
| 4,206,591 A * | 6/1980 | Maekawa | G04B 39/00 | 368/286 |
| 4,222,228 A * | 9/1980 | Masui | G04B 39/02 | 368/294 |

(Continued)

FOREIGN PATENT DOCUMENTS

| | | |
|---|---|---|
| CH | 183 912 A | 4/1936 |
| EP | 2 624 076 A1 | 8/2013 |

(Continued)

OTHER PUBLICATIONS

Written Opinion in French dated Jun. 24, 2020, issued in counterpart EP Patent Application No. 19218605.4 (8 pages). Statement Regarding Foreign Language Document: The written opinion includes a chart on p. 2 that identifies relevance portions of the cited documents as category X or A (based on standard PCT notation) and the relevant figures in relation to the applicable claims.

*Primary Examiner* — Edwin A. Leon
(74) *Attorney, Agent, or Firm* — WHDA, LLP

(57) ABSTRACT

A timepiece component for a timepiece case or for a timepiece includes a first ring, at least one decorative and/or display element, a second ring, and an elastic element mounted so as to bear on the first ring and to urge the at least one decorative and/or display element toward the second ring.

20 Claims, 4 Drawing Sheets

I-I

II-II

(56) References Cited

U.S. PATENT DOCUMENTS

| | | | | |
|---|---|---|---|---|
| 4,308,611 | A * | 12/1981 | Kanai .................... | G04B 39/02 368/294 |
| 4,391,534 | A * | 7/1983 | Matsumura .......... | G04B 37/084 368/294 |
| 10,345,760 | B2 * | 7/2019 | Kayano ................ | G04B 43/002 |
| 2013/0201804 | A1 | 8/2013 | Bertrand et al. | |

FOREIGN PATENT DOCUMENTS

| | | | |
|---|---|---|---|
| JP | 55-73886 | U | 5/1980 |
| JP | 56-31383 | U | 3/1981 |
| WO | 2019/158499 | A1 | 8/2019 |

* cited by examiner

TIMEPIECE COMPONENT FOR A TIMEPIECE CASE OR FOR A TIMEPIECE

This application claims priority of European Patent Application No. EP19218605.4, filed on Dec. 20, 2019, the contents of which is hereby incorporated by reference herein in its entirety.

The invention relates to a timepiece component for a timepiece case or for a timepiece. The invention also relates to a timepiece case comprising such a component. The invention also relates to a timepiece comprising such a component or such a case. Lastly, the invention relates to a method for mounting a timepiece or such a component or such a case.

The prior art mentions a large number of bezels for watch cases. These bezels may, for example, comprise a bezel ring onto which is driven at least one decorative element such as a decorative and/or display disk made, for example, of a ceramic. Such a bezel design is entirely satisfactory. However, it has the drawback of requiring a driving operation for each decorative element in the case of a bezel provided with a plurality of decorative elements. The operation of assembling such a bezel may thus be particularly time-consuming. Furthermore, the hold with respect to driving of the decorative element, and therefore the quality of assembly of the bezel, depends on the size of said decorative element and in particular on the area of contact between said decorative element and the bezel ring. Thus, the size and/or the number of decorative elements is at least partially dictated by the design of the bezel.

A bezel design is known from patent application EP2624076 in which a display disk is driven into a bezel ring, and rests on a disassembly ring.

Patent application EP2615507 relates to a design allowing the hold of a decorative element made of ceramic within, in particular, a bezel ring to be maximized. To do this, an intercalary element taking the form of a seal is arranged at the interface of the bezel ring and of the decorative element, the surface of said decorative element that is intended to cooperate with the intercalary element being textured so as to increase its roughness. More particularly, the intercalary element is arranged radially between the bezel ring and the decorative element.

Patent application WO2019158499, for its part, relates to a solution for assembling a decorative element within, in particular, a bezel ring, which constitutes an alternative to the traditional driving. To do this, it proposes the use of a resin so as to hold the decorative element in a cavity formed, for example, in a bezel ring.

The aim of the invention is to provide a timepiece component for a timepiece case or for a timepiece that makes it possible to overcome the drawbacks mentioned above and to improve the timepiece components known from the prior art. In particular, the invention proposes a timepiece component that is simpler to implement.

A component for a timepiece case according to the invention is defined by claim 1.

Various component embodiments are defined by claims 2 to 11.

A timepiece case according to the invention is defined by claim 12.

A timepiece according to the invention is defined by claim 13.

Methods for mounting a timepiece component or a timepiece case or a timepiece are defined by claims 14 and 15.

The appended drawings show, by way of examples, three embodiments of a timepiece according to the invention.

Figure 1:
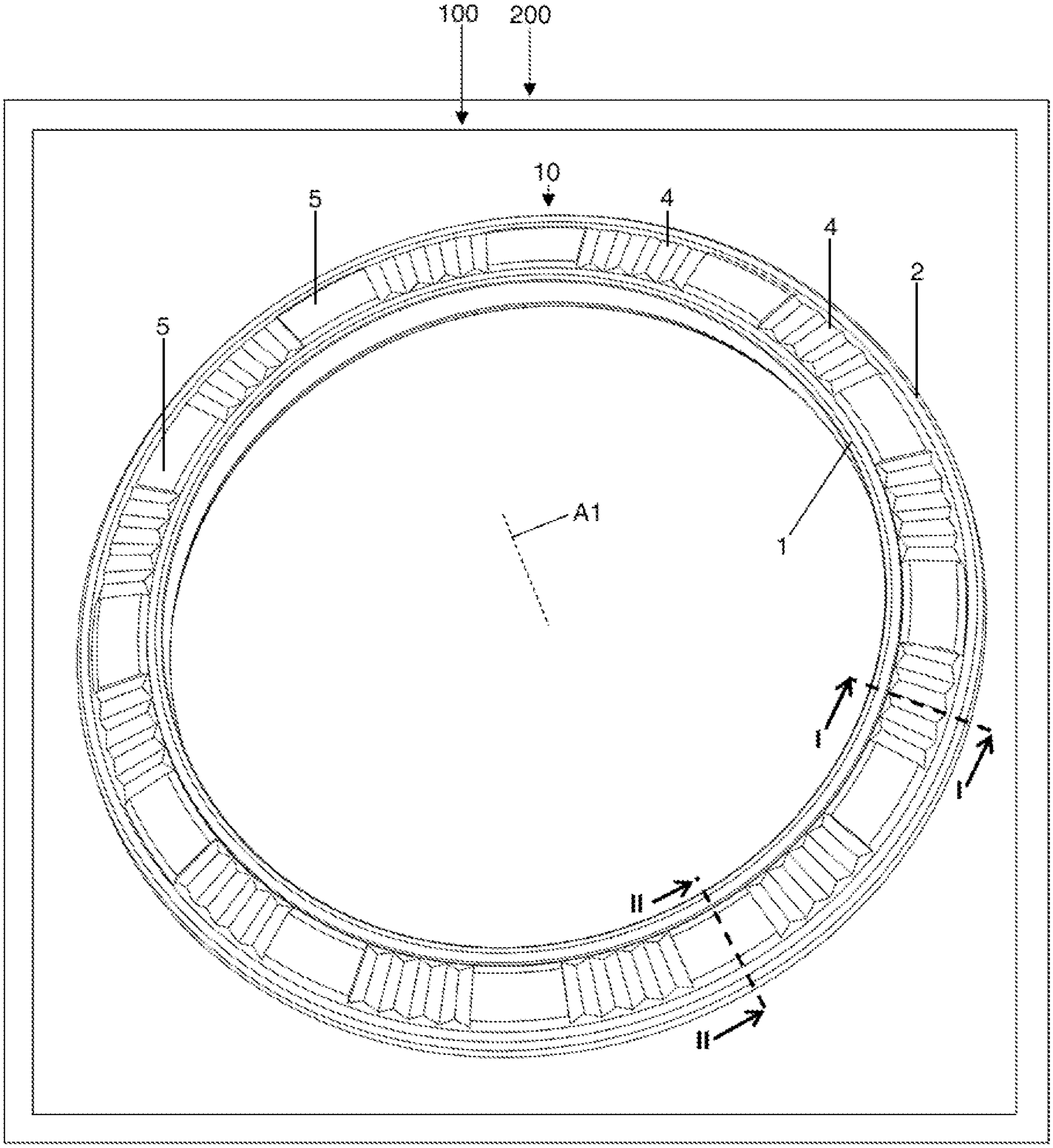
FIG. 1 is a schematic view of a first embodiment of a timepiece.

A first embodiment of a timepiece 200 is described below with reference to FIGS. 1 to 5.

The timepiece is for example a watch, in particular a wristwatch.

The timepiece preferably comprises a timepiece case 100. The timepiece further comprises a timepiece movement. The timepiece movement is intended to be mounted in the watch case in order to protect it from the external environment.

The timepiece movement may be an electronic movement or a mechanical movement, in particular an automatic movement.

The watch case 100 preferably comprises a case middle 6 and a component 10 of bezel type. The watch case 100 also preferably comprises a case back attached to the case middle and a glass fitted to the case middle.

The bezel may be fixedly mounted on the case middle. Alternatively, the bezel may be a rotating bezel, that is to say one that is mounted movably so as to rotate on the case middle 6 about an axis A1. The axis A1 may be an axis of the bezel. The axis A1 may be an axis of revolution of the bezel or substantially an axis of revolution of the bezel. The axis A1 may also be an axis of rotation of the bezel. Preferably, the axis A1 is an axis common to the bezel and to the case middle 6.

The bezel 10 comprises:

- a first ring 1,
- at least one decorative and/or display element 4, 5,
- a second ring 2,
- an elastically deformable intercalary means 3 mounted so as to bear on the first ring 1 and to urge the at least one decorative and/or display element 4, 5 toward the second ring 2.

In other words, the bezel comprises at least one decorative and/or display element 4, 5 arranged at the interface of the first ring 1 and of the second ring 2. The elastically deformable intercalary means 3 or elastic element 3 allows the at least one decorative and/or display element 4, 5 to be held with minimal play between the first and second rings 1 and 2.

In the assembled state of the bezel, the elastic element is elastically deformed by compression in a direction parallel or substantially parallel to the axis A1. The elastic element consequently exerts, on the first and second rings, antagonistic forces that are parallel or substantially parallel to the axis A1. These forces tend to separate the rings or to move them apart. One of these forces is exerted indirectly by the elastically deformable element on one of the first and second rings, via the at least one decorative and/or display element 4, 5. As a result, the decorative and/or display element 4, 5 is pressed or urged against this ring. This ring is the second ring in the first embodiment. Thus, the decorative and/or display element 4, 5 is mounted with minimal play between the first and second rings.

The first ring is, for example, a lower bezel ring.

The second ring is, for example, an upper bezel ring.

The upper bezel ring is oriented, for example, toward the outside of the watch case, while at least a portion of the lower bezel ring is, for example, oriented towards the inside of the watch case. The lower bezel ring is in particular closer to the annular seat of the case middle than the upper bezel ring is.

The at least one decorative and/or display element 4, 5 may comprise at least a first element of a first type 4 and/or at least a second element of a second type 5. The first and second elements are distinguished from each other, for example, by their geometries and/or by their materials and/or by their colors and/or by their surface treatments. By way of example, FIG. 1 illustrates a bezel 10 comprising twelve same elements 4 and twelve same elements 5. The first elements 4 are, for example, in the shape of a portion of a disk or of a frustum of a cone that is fluted. The second elements 5 are, for example, in the shape of a portion of a disk that is smooth or of a frustum of a cone.

These elements may or may not be distributed evenly about the axis A1 of revolution and/or of rotation of the bezel 10. These decorative and/or display elements may be arranged so as to constitute a device for displaying an indication of the time or so as to be derived from the time of a timepiece. They then constitute display elements. Alternatively or in addition, these elements may be distributed so as to constitute decorative elements of a timepiece. They then constitute decorative elements.

Optionally, a first angular positioning element, for example a pin, may be provided on either of the first and the second rings so as to angularly position the at least one decorative and/or display element with respect to the axis A1. This angular positioning element may advantageously cooperate with a second angular positioning element, for example a hole provided in the at least one decorative and/or display element. For example, the pin is intended to be housed in the hole. These elements thus cooperate so as to angularly position the one or more decorative and/or display elements about the axis A1 relative to the first ring and/or to the second ring.

Figure 2:
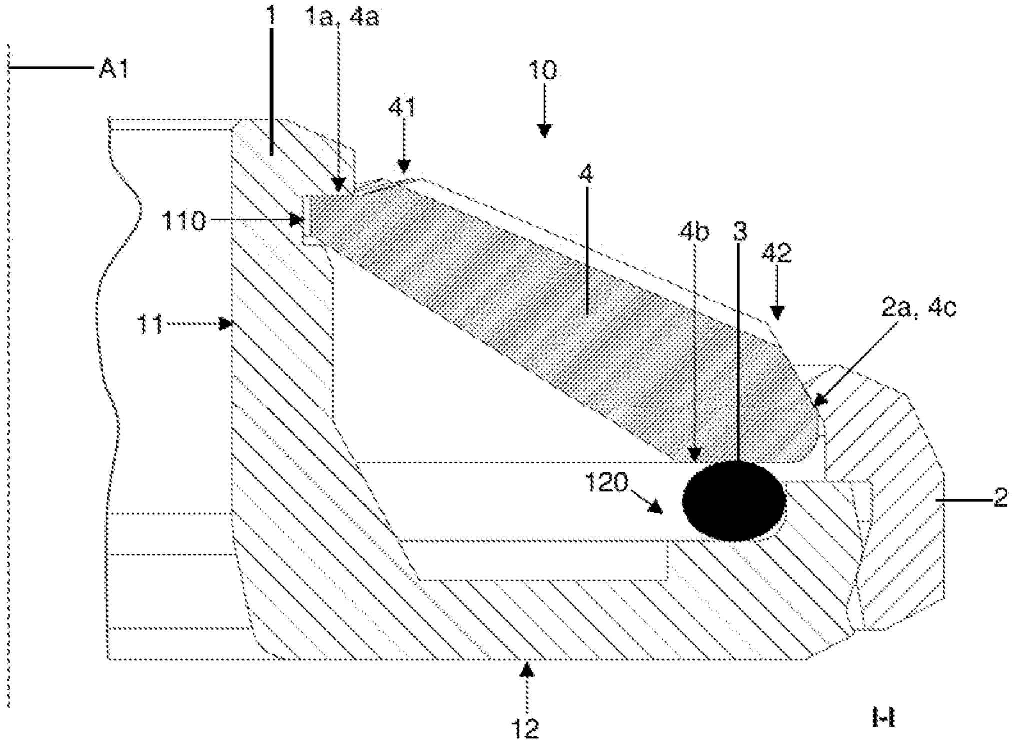
FIG. 2 is a sectional view along a first plane I-I of a component of the first embodiment.

FIG. 2 is a partial sectional view of the bezel 10 of FIG. 1, along a first plane I-I passing through the axis A1 and intersecting a first decorative and/or display element 4 of the first type. The first ring has an L-shaped or substantially L-shaped section (along this plane I-I). A surface 4*a* of the decorative and/or display element 4 bears against a bearing surface 1*a* of a first portion 11 of the first ring 1. The first portion is oriented in a direction parallel or substantially parallel to the axis A1. This first portion is globally tubular in shape. These surfaces 1*a* and 4*a* are advantageously perpendicular or substantially perpendicular to the axis A1 of the bezel 10. Advantageously, the surface 4*a* is arranged at a first end 41 of the element 4, in particular a first end in a radial direction relative to the axis A1. Again advantageously, the surface 1*a* constitutes a wall of a first receiving groove 110 formed in the first ring and in which the end 41 of the element 4 is housed. A second surface 4*b* is then intended to bear against the elastic element 3 which was previously arranged within a housing 120, in particular a shoulder or a second groove, for receiving the elastic element 3. This housing is formed within a second portion 12 of the first ring 1. This second portion is oriented in a direction perpendicular or substantially perpendicular to the axis A1. This second portion 12 is planar or globally planar in shape.

The elastic element 3 may, for example, take the form of a seal, in particular of an O-ring, for example made of an elastomeric material. Advantageously, the surface 4*b* is arranged at a second end 42 of the element 4, in particular a second end in a radial direction relative to the axis A1. This surface 4*b* is advantageously perpendicular or substantially perpendicular to the axis A1 of the bezel 10.

Figure 3:
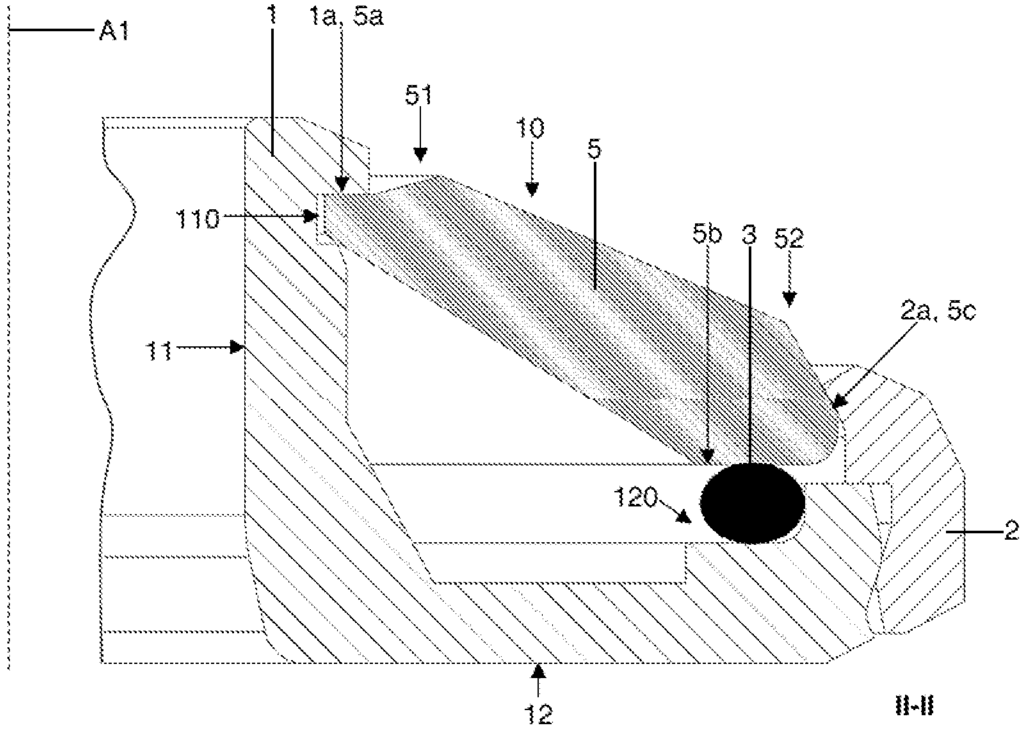
FIG. 3 is a sectional view along a second plane II-II of this component.
Figure 4:
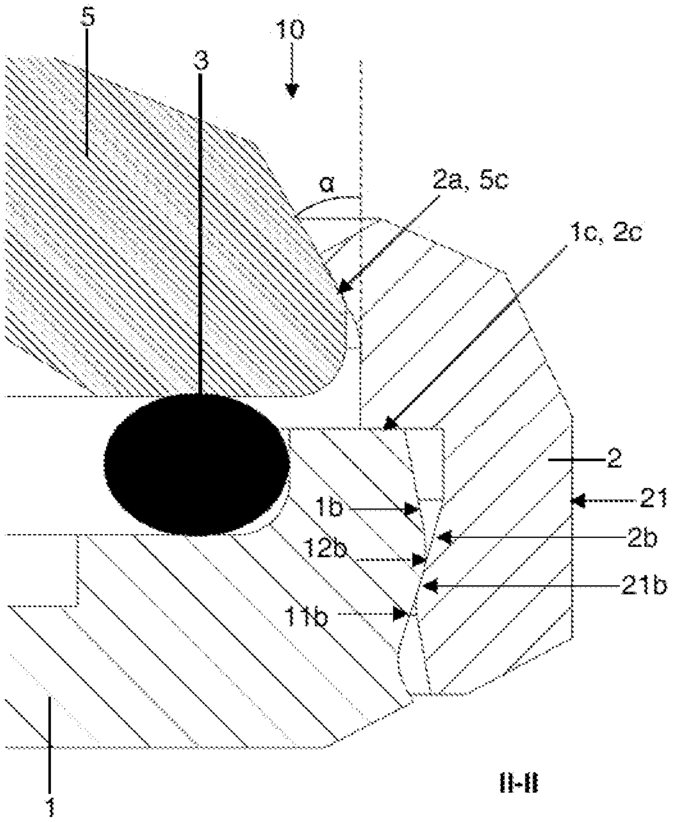
FIG. 4 is an enlarged partial sectional view of this component along the second plane II-II.

FIG. 3 is a partial sectional view of the bezel 10 of FIG. 1, along a second plane II-II passing through the axis A1 and intersecting a second decorative and/or display element 5 of the second type. This second element 5 is arranged within the first ring 1 in the same way as the first element 4. Thus, a surface 5*a* of the decorative and/or display element 5 bears against the bearing surface 1*a* of the first portion 11 of the first ring 1. This surface 5*a* is perpendicular or substantially perpendicular to the axis A1 of the bezel 10. Advantageously, the surface 5*a* is arranged at a first end 51 of the element 5, in particular a first end in a radial direction relative to the axis A1. Again advantageously, the end 51 of the element 5 is intended to be housed in the first groove 110. The geometry of the first groove 110 may be different at the location intended for the end of the element 5 with respect to the geometry intended to house the end of the element 4, so as in particular to allow indexing of the elements. A second surface 5*b* is then provided so as to bear against the elastic element 3. Advantageously, the surface 5*b* is arranged at a second end 52 of the element 5, in particular a second end in a radial direction relative to the axis A1. This surface 5*b* is perpendicular or substantially perpendicular to the axis A1 of the bezel 10.

The first and second elements 4, 5 are both held within the first ring 1 by the second ring 2.

This second ring is annular or substantially annular in shape. It comprises a bearing surface 2*a* intended to cooperate with one of the surfaces 4*c*, 5*c* of the elements 4, 5 so as to hold the elements 4, 5. Preferably, these surfaces 2*a*, 4*c*, 5*c* are frustoconical in shape or are portions of a frustum of a cone forming an angle $\alpha$ or substantially forming an angle $\alpha$ with the axis A1. The angle $\alpha$ is the half-angle at the apex of the cone. The angle $\alpha$ is between 15° and 45°, in particular the angle $\alpha$ is of the order of 30°.

The second ring 2 comprises a surface 2*b* shaped so as to be clipped or driven against a peripheral surface 1*b* of the first ring 1. To do this, the second ring 2 comprises a surface 2*b* comprising a first boss 21*b* intended to cooperate with a hollow 11*b* of the peripheral surface 1*b* of the ring 1.

This surface 2*b* is for example borne by a portion 21 of ring 2 which is intended to deform elastically and radially along the axis A1 during the operation of driving or clipping the ring 2 against the ring 1. Specifically, during this operation performed by moving at least one ring in translation along the axis A1 relative to the other ring, the first boss 21*b* tends to deform the portion 21 under the effect of its cooperation with a second boss 12*b* of the first ring 1. Once the boss 21*b* has passed the boss 12*b*, the ring 2 is held axially under the effect of the cooperation of the hollow 11*b* and the boss 21*b* which are pressed one against the other by the action of the elastic element 3 which acts as an elastic return means or an elastic urging means.

The elastic element 3 also has the advantage of avoiding any risk of static indeterminacy of the second ring 2, in particular when the latter is driven so as to abut against the first ring 1. This is the case of the embodiment illustrated in FIGS. 1 to 4, within which a surface 2*c* of the second ring 2 abuts against a surface 1*c* of the first ring 1 once the operation of driving or clipping the second ring against the first ring has been completed.

Alternatively, the surface 1*b* may be threaded, for example externally threaded, and the surface 2*b* may be threaded, for example internally threaded. Thus, the second ring 2 may be screwed onto the first ring 1 about the axis A1.

The role of the element 3 is twofold, namely to allow reliable and lasting assembly of the ring 2 against the ring 1 while avoiding the risks of static indeterminacy with respect to the elements 4, 5.

Depending in particular on the shaping of the surfaces 1*b* and 2*b*, the second ring 2 may or may not be dismountable from the first ring 1, Additionally or alternatively, an operation of bonding, soldering or brazing the second ring against the first ring may also take place. More particularly, an operation of bonding, soldering or brazing the surfaces 1*b* and 2*b* may take place.

The bezel 10 may be fixed relative to the case middle 6 of the watch case 100. For example, an internal surface 1*d* of the portion 11 of the first ring 1 may be driven against the case middle 6, in particular against a seal of the case middle, not shown.

Figure 5:
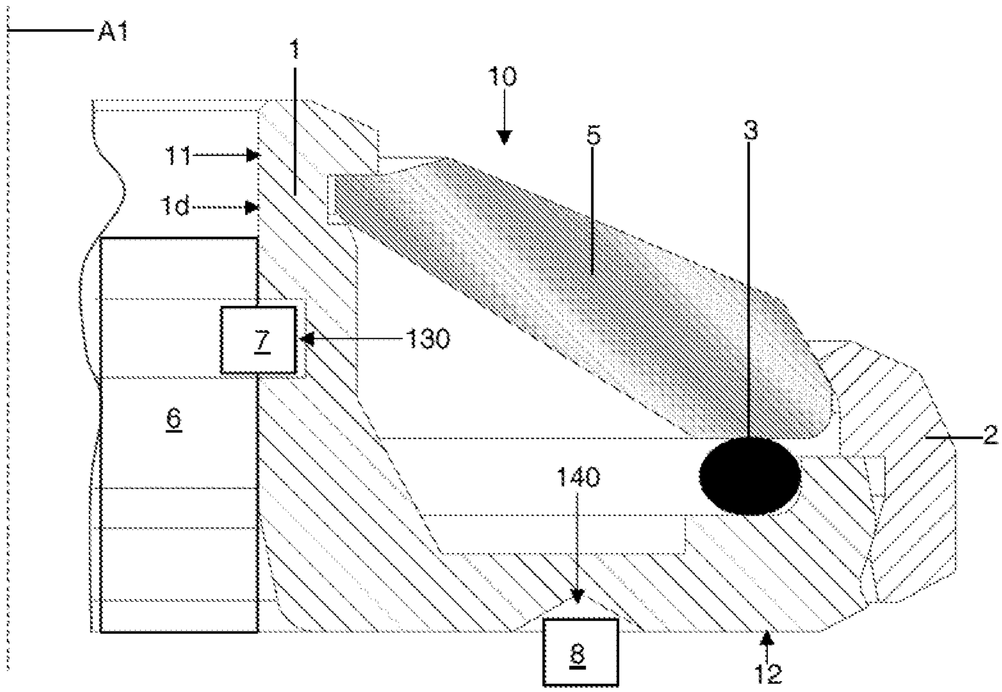
FIG. 5 is a sectional view of one variant of the first embodiment of a timepiece.

As an alternative, as in the variant of the first embodiment of a timepiece shown partially in FIG. 5, the bezel 10 may be able to rotate about the case middle 6, relative to the axis A1. To do this, the portion 11 may comprise a third groove 130 intended to accept an axial retaining seal 7 which is intended to press the portion 12 of the ring 1 against an annular seat of the case middle. Optionally, the portion 12 may comprise means for angular indexing and/or notching 140, which are intended to cooperate with means for angular indexing and/or notching 8 of the case middle 6.

The first and/or the second ring 1, 2 may be made of:
- a metal alloy such as an aluminum alloy, a titanium alloy, a palladium alloy, a steel or a precious gold- or platinum-based alloy,
- a ceramic mainly or primarily composed of zirconia,
- a ceramic mainly or primarily composed of alumina,
- a ceramic mainly or primarily composed of silicon nitride,
- a ceramic mainly or primarily composed of boron carbide or aluminum nitride,
- a composite, in particular an alumina-zirconia composite (ZTA/ATZ) or a cermet.

At least one decorative and/or display element 4, 5 or some decorative and/or display elements 4, 5 or all of the decorative and/or display elements 4, 5 may each be made of:
- a metal alloy such as an aluminum alloy, a titanium alloy, a palladium alloy, a steel or a precious gold- or platinum-based alloy,
- a ceramic mainly or primarily composed of zirconia,
- a ceramic mainly or primarily composed of alumina,
- a ceramic mainly or primarily composed of silicon nitride,
- a ceramic mainly or primarily composed of boron carbide or aluminum nitride,
- a composite, in particular an alumina-zirconia composite (ZTA/ATZ) or a cermet,
- a stone, in particular a precious or semi-precious stone,
- a glass.

The at least one decorative and/or display element 4, 5 may take at least substantially a disk-ring shape or a frustoconical shape.

Thus, a first 4 decorative and/or display element and/or a second decorative and/or display element 5 may take the shape of a disk ring portion or of a frustoconical portion. In the embodiment of FIGS. 1 to 4, the elements 4, 5 each take the shape of a portion of a frustum of a cone extending along an angle of 15° or substantially 15° about the axis A1. Of course, the elements 4, 5 may take the shape of portions of a disk ring or of a frustum of a cone extending along another angle about the axis A1.

Figure 6:
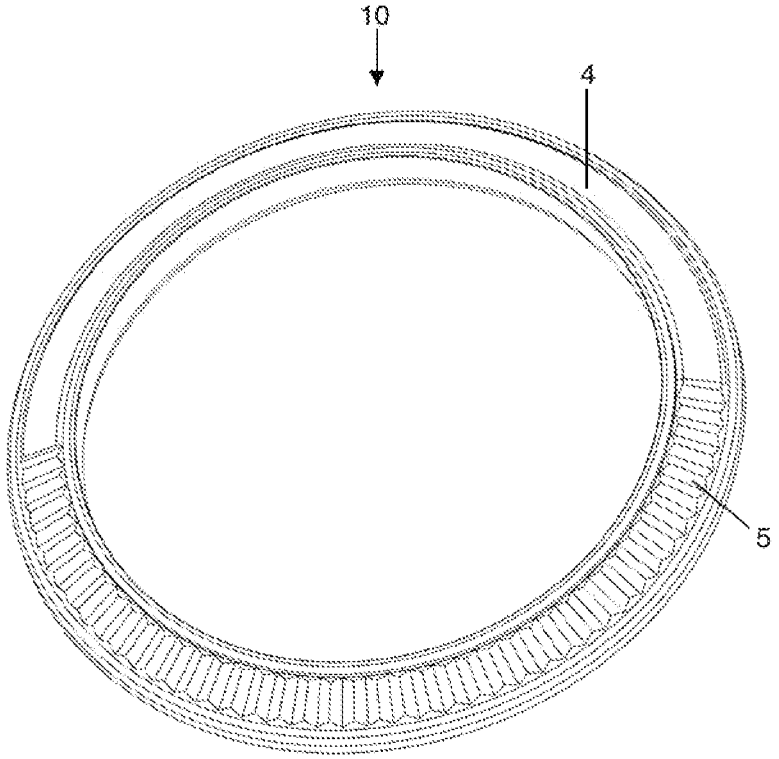
FIG. 6 is a perspective view of a component of a second embodiment of a timepiece.

A second embodiment of a timepiece is described below with reference to FIG. 6 in which only the bezel 10 is shown. In this second embodiment, the timepiece differs from the first embodiment, for example, only in that the bezel comprises two decorative and/or display elements 4, 5 each extending along an angle of 180° about the axis A1.

Figure 7:
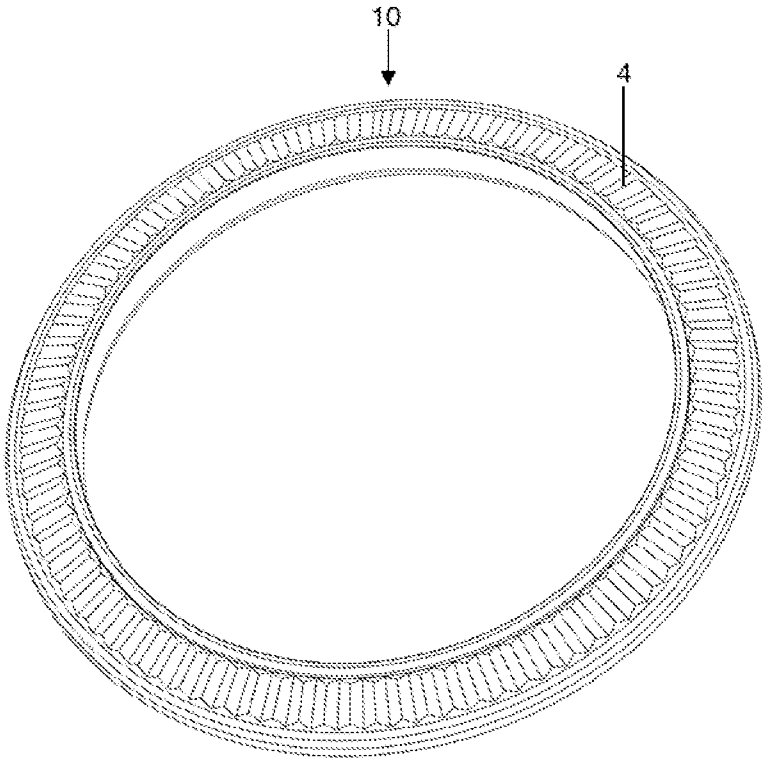
FIG. 7 is a perspective view of a component of a third embodiment of a timepiece.

A third embodiment of a timepiece is described below with reference to FIG. 7 in which only the bezel 10 is shown. In this third embodiment, the timepiece differs in particular from the first embodiment in that the bezel comprises a single decorative and/or display element 4 in the shape of a disk ring or of a frustum of a cone. Such an embodiment is particularly advantageous in the case of a bezel 10 the second ring 2 of which can be dismounted from the first ring 1, since it allows easy dismounting of the disk ring 4 or of the frustum of a cone without risk of cracking the disk ring 4 or of the frustum of a cone in the case where the latter is made of a fragile material such as ceramic.

In the embodiments described and shown, the component is a bezel 10. However, the invention also applies to any external element such as a flange, a crown, a dial or a portion of a dial.

In the embodiments described and shown, the elastic element is mounted between the first ring (lower ring) and the at least one decorative and/or display element. However, as a variant, the elastic element may be mounted between the second ring (upper ring) and the at least one decorative and/or display element.

One embodiment of a method for mounting a component 10 or a case 100 of a timepiece 200 or a timepiece 200 is described below.

In a first variant, the method comprises the following steps:
- arranging the elastic element 3 on the first ring 1,
- arranging the at least one decorative and/or display element 4, 5 on the elastic element 3 and on the first ring 1,
- mounting the second ring 2 on the first ring 1, in particular by clipping or by driving or by screwing.

In a second variant, the method comprises the following steps:
- arranging the at least one decorative and/or display element 4, 5 on the first ring 1,
- arranging the elastic element 3 on the at least one decorative and/or display element 4, 5 or on the second ring 2,
- mounting the second ring 2 on the first ring 1, in particular by clipping or by driving or by screwing.

The invention also relates to a component 10 or a case 100 of a timepiece 200 or a timepiece 200 obtained by implementing the mounting methods described above.

The bezel solution described above makes it possible to increase the number of decorative and/or display elements without negatively affecting their hold within the bezel, or requiring adhesive for the attachment of each of the decorative and/or display elements. Such a design makes it possible, in addition, to provide a method for assembling a bezel that is particularly advantageous with regard to its simplicity of implementation and its execution time, in particular in the case of a bezel comprising at least two decorative and/or display elements. Such a design also makes it possible to provide new esthetic bezel variations combining, for example, stones and portions of disks made of metal or of ceramic.

The invention claimed is:

1. A timepiece component for a timepiece case or for a timepiece, the component comprising:

a first ring, at least one decorative and/or display element, a second ring, an elastic element mounted so as to bear on the first ring and to urge the at least one decorative and/or display element toward the second ring, wherein the component is a bezel, and wherein the decorative and/or display element is in direct contact with the second ring.

2. The component as claimed in claim 1, wherein the at least one decorative and/or display element comprises at least a first element and at least a second element, the first and second elements being distinguished by their geometries and/or by their materials and/or by their colors and/or by their surface treatments.

3. The component as claimed in claim 1, wherein the at least one decorative and/or display element takes at least substantially a ring shape or a frustoconical shape.

4. The component as claimed in claim 1, wherein the timepiece component comprises a plurality of decorative and/or display elements and wherein the decorative and/or display elements take a shape of ring portions or frustoconical portions.

5. The component as claimed in claim 1, wherein at least one decorative and/or display element or some decorative and/or display elements or all of the decorative and/or display elements are each made of any of the following materials:

a metal alloy, a ceramic mainly or primarily composed of zirconia, a ceramic mainly or primarily composed of alumina, a ceramic mainly or primarily composed of silicon nitride, a ceramic mainly or primarily composed of boron carbide or aluminum nitride, a composite, in particular an alumina-zirconia composite (ZTA/ATZ), a cermet, stone, and a glass.

6. The component as claimed in claim 1, wherein the second ring is joined to the first ring by driving or by clipping or by screwing.

7. The component as claimed in claim 1, wherein the second ring comprises a boss or a hollow, respectively, and wherein the first ring comprises a hollow or a boss, respectively, the boss cooperating by contact with the hollow so as to hold the second ring in position on the first ring.

8. The component as claimed in claim 1, wherein the elastic element is an O-ring.

9. The component as claimed in claim 1, wherein the first ring comprises a first groove for receiving the at least one decorative and/or display element and/or wherein the first ring comprises a housing for receiving the elastic element.

10. The component as claimed in claim 1, wherein the second ring comprises a frustoconical surface cooperating by contact with one or more frustoconical surfaces provided on the at least one decorative and/or display element.

11. The timepiece case comprising the timepiece component as claimed in claim 1.

12. The timepiece, comprising the timepiece case as claimed in claim 11.

13. A method for manufacturing the timepiece component as claimed in claim 1, the method comprising the following steps:

arranging the elastic element on the first ring, arranging the at least one decorative and/or display element on the elastic element and on the first ring, mounting the second ring on the first ring.

14. A method for manufacturing the timepiece component as claimed in claim 1, the method comprising the following steps:

arranging the at least one decorative and/or display element on the first ring, arranging the elastic element on the at least one decorative and/or display element or on the second ring, mounting the second ring on the first ring.

15. The component as claimed in claim 1, wherein the component is a rotating bezel.

16. The component as claimed in claim 1, wherein the at least one decorative and/or display element comprises at least a first element and at least a second element, the first and second elements being distinguished by their geometries and/or by their materials and/or by their colors and/or by their surface treatments.

17. The component as claimed in claim 1, wherein the at least one decorative and/or display element takes at least substantially a ring shape or a frustoconical shape.

18. The component as claimed in claim 2, wherein the at least one decorative and/or display element takes at least substantially a ring shape or a frustoconical shape.

19. The component as claimed in claim 1, wherein the timepiece component comprises a plurality of decorative and/or display elements and wherein the decorative and/or display elements take a shape of ring portions or frustoconical portions.

20. The component as claimed in claim 5, wherein the stone is a precious or semi-precious stone.

* * * * *